(12) United States Patent
Schroers et al.

(10) Patent No.: US 12,135,334 B2
(45) Date of Patent: Nov. 5, 2024

(54) METHOD FOR REDUCING A MICROBREAK MEMORY AREA AND ENHANCED TIMING SCHEME FOR FREEZING MICROBREAK FEATURE FOR A SPEED SENSOR

(71) Applicant: Infineon Technologies AG, Neubiberg (DE)

(72) Inventors: Christoph Schroers, Villach (AT); Simon Hainz, Villach (AT); Alessandro Petri, Villach (AT); Massimiliano Zilli, Villach (AT)

(73) Assignee: Infineon Technologies AG, Neubiberg (DE)

( * ) Notice: Subject to any disclaimer, the term of this patent is extended or adjusted under 35 U.S.C. 154(b) by 174 days.

(21) Appl. No.: 17/854,293

(22) Filed: Jun. 30, 2022

(65) Prior Publication Data
US 2023/0152344 A1  May 18, 2023

Related U.S. Application Data

(60) Provisional application No. 63/280,169, filed on Nov. 17, 2021.

(51) Int. Cl.
*G01P 3/487* (2006.01)
*G01P 3/481* (2006.01)

(52) U.S. Cl.
CPC ............ *G01P 3/487* (2013.01); *G01P 3/4815* (2013.01)

(58) Field of Classification Search
CPC ...... G01P 3/42; G01P 3/44; G01P 3/48; G01P 3/481; G01P 3/487; G01P 3/488; G01P 3/4815; G01D 5/12; G01D 5/14; G01D 5/145; G01D 5/16; G01R 33/02; G01R 33/06–098
See application file for complete search history.

(56) References Cited

U.S. PATENT DOCUMENTS

| 6,687,644 | B1* | 2/2004 | Zinke ...................... B60T 8/171 73/488 |
| 2011/0298447 | A1* | 12/2011 | Foletto .................... G01P 3/489 324/207.2 |
| 2014/0375312 | A1* | 12/2014 | Friedrich .............. G01P 3/4802 324/259 |

(Continued)

*Primary Examiner* — Huy Q Phan
*Assistant Examiner* — David B Frederiksen
(74) *Attorney, Agent, or Firm* — Harrity & Harrity, LLP

(57) ABSTRACT

A magnetic sensor configured to detect a rotation of an object includes at least one sensor element configured to generate at least one sensor signal based on a magnetic field that is modulated by the rotation of the object; a sensor circuit configured to generate a data transmission signal based on the at least one sensor signal, wherein the data transmission signal comprises a plurality of data transmission blocks; and a memory configured to store transmission block status information indicative of whether or not one of the plurality of data transmission blocks has been triggered for transmission. The sensor circuit is configured to detect an interrupt event that disrupts the transmission of the data transmission signal and avoid a complete loss of a data transmission block due to the detected interrupt event based on the transmission block status information present at a time the interrupt event is detected.

20 Claims, 11 Drawing Sheets

(56) References Cited

U.S. PATENT DOCUMENTS

| | | | | |
|---|---|---|---|---|
| 2016/0011279 A1* | 1/2016 | Rasbornig | ......... | G01R 33/0029 |
| | | | | 324/247 |
| 2016/0108842 A1* | 4/2016 | Mirassou | ................. | G01P 3/44 |
| | | | | 73/1.41 |
| 2017/0336225 A1* | 11/2017 | Burdette | ................. | G01P 3/487 |
| 2018/0335441 A1* | 11/2018 | Hammerschmidt | .... | G01P 3/488 |
| 2019/0011292 A1* | 1/2019 | Hainz | .................... | G01P 3/489 |
| 2020/0096577 A1* | 3/2020 | Fontanesi | ................. | G01P 3/00 |

* cited by examiner

METHOD FOR REDUCING A MICROBREAK MEMORY AREA AND ENHANCED TIMING SCHEME FOR FREEZING MICROBREAK FEATURE FOR A SPEED SENSOR

RELATED APPLICATION

This application claims priority to U.S. Provisional Application No. 63/280,169, filed Nov. 17, 2021, which is incorporated herein by reference in its entirety.

FIELD

The present disclosure relates generally to sensing a wheel speed, and, more particularly, to magnetic speed sensors.

BACKGROUND

To measure wheel speed (e.g., in an automotive application) typically a ferromagnetic wheel is used in combination with a magnetic sensitive sensor and a magnet mounted to the sensor. The sensor generates output-pulses. A control unit counts the pulses and is able to calculate wheel-speed and actual angle of the rotating wheel, as well as optionally determine the rotation direction of the wheel. A sensor generates a sinusoidal signal as the ferrous ferromagnetic wheel rotates in front of the sensor. Speed may be calculated based on zero-crossing timings at which the sinusoidal signal crosses a zero-crossing threshold. However, other switching thresholds are possible.

Microbreak registers are memory registers used to temporary store information in order not to lose internal status information of a sensor chip (i.e., calibration data). Usually, the use of microbreak registers is limited by their area occupation, an important cost factor for the chip. A microbreak register is usually used in low-cost application solutions where more expensive systems like external capacitors are not possible to be used.

Microbreak registers are memory registers used to dump information regarding sensor status. These registers are designed to be able to withstand a short interruption of the supply voltage in the range of some hundreds of microseconds. During the normal functionality, the data registers are continuously written together. Once the data register is written, the validity bit is written. The validity bit register is designed in order to have a systematic lower storage time than the data bit: this ensures that if the validity bit has a valid value, the data registers have a valid content. The data registers as well as the validity register are duplicated in redundant registers, in order to have always a valid copy of the information available. This is needed because if a microbreak event happens during the writing of one copy of the data register, the other copy has the last valid data.

A freezing microbreak feature stores calibration information that can be retrieved by the sensor to continue operation after a supply interruption occurs. The supply interruption may be caused by a micro break, a micro short, or an electrostatic discharge (ESD) event, for example.

For two pin sensors using current modulation protocol the strategy on how to resume with the protocol can be optimized depending on the type of current modulation protocol. For example, different protocols include a 7/14 mA duty cycle protocol, a 7/14/28 mA AK protocol, and a 7/14 pulse-width modulation (PWM) protocol.

The current solution is to not repeat or complete a protocol (e.g., a data transmission frame or block) that has been interrupted. In the extreme case, the protocol gets interrupted immediately after it was triggered. As a result, a full protocol (i.e., an entire data transmission frame or block) never gets transmitted by the sensor and is therefore missing at an electronic control unit (ECU) located at a receiver side of the system.

Therefore, an improved method that prevents a complete loss of protocols is desired. To achieve this, the improved method modifies a timing sequence.

SUMMARY

Magnetic sensor modules, systems and methods are provided, configured to detect a rotation of an object, and, and more particularly, to detect a speed of rotation of an object.

One of more embodiments provide a magnetic sensor configured to detect a rotation of an object, comprising: at least one sensor element configured to generate at least one sensor signal based on magnetic field that is modulated by the rotation of the object; and a sensor circuit configured to monitor the at least one sensor signal and generate a data transmission signal based thereon, wherein the data transmission signal comprises a speed signal portion and a data signal portion combined according to a transmission protocol, wherein the transmission protocol includes avoiding a complete loss of a transmission block in the event of a current supply interrupt, wherein each transmission block includes a speed pulse and a plurality of data bits.

One of more embodiments provide a magnetic sensor configured to detect a rotation of an object, including: at least one sensor element configured to generate at least one sensor signal based on a magnetic field that is modulated by the rotation of the object; a sensor circuit configured to evaluate the at least one sensor signal and generate a data transmission signal based on the evaluation of the at least one sensor signal, wherein the data transmission signal includes a plurality of data transmission blocks and each data transmission block has a protocol configuration including a speed signal portion and a data signal portion combined according to a transmission protocol, wherein the speed signal portion corresponds to a rotational speed of the object and the data signal portion provides additional information; and a memory including a transmission block status register configured to store a transmission block status bit indicative of whether or not one of the plurality of data transmission blocks has been triggered for transmission, wherein the sensor circuit is configured to detect an interrupt event that disrupts the transmission of the data transmission signal and avoid a complete loss of a data transmission block due to the detected interrupt event based on a bit value of the transmission block status bit at a time the interrupt event is detected.

One of more embodiments provide a method of transmitting a data transmission signal of a magnetic sensor configured to detect a rotation of an object, the method including: generating, by at least one sensor element, at least one sensor signal based on a magnetic field that is modulated by the rotation of the object; evaluating, by a sensor circuit, the at least one sensor signal and generating a data transmission signal based on the evaluation of the at least one sensor signal, wherein the data transmission signal includes a plurality of data transmission blocks and each data transmission block has a protocol configuration including a speed signal portion and a data signal portion combined according to a transmission protocol, wherein the speed signal portion corresponds to a rotational speed of the object and the data signal portion provides additional information; storing, by the sensor circuit, a transmission block status bit in a transmission block status register, wherein the transmission block status bit indicates whether or not one of the plurality of data transmission blocks has been triggered for transmission; detecting, by the sensor circuit, an interrupt event that disrupts the transmission of the data transmission signal; and avoiding, by the sensor circuit, a complete loss of a data transmission block due to the detected interrupt event based on a bit value of the transmission block status bit at a time the interrupt event is detected.

BRIEF DESCRIPTION OF THE DRAWINGS

Embodiments are described herein making reference to the appended drawings.

DETAILED DESCRIPTION

Figure 1A:
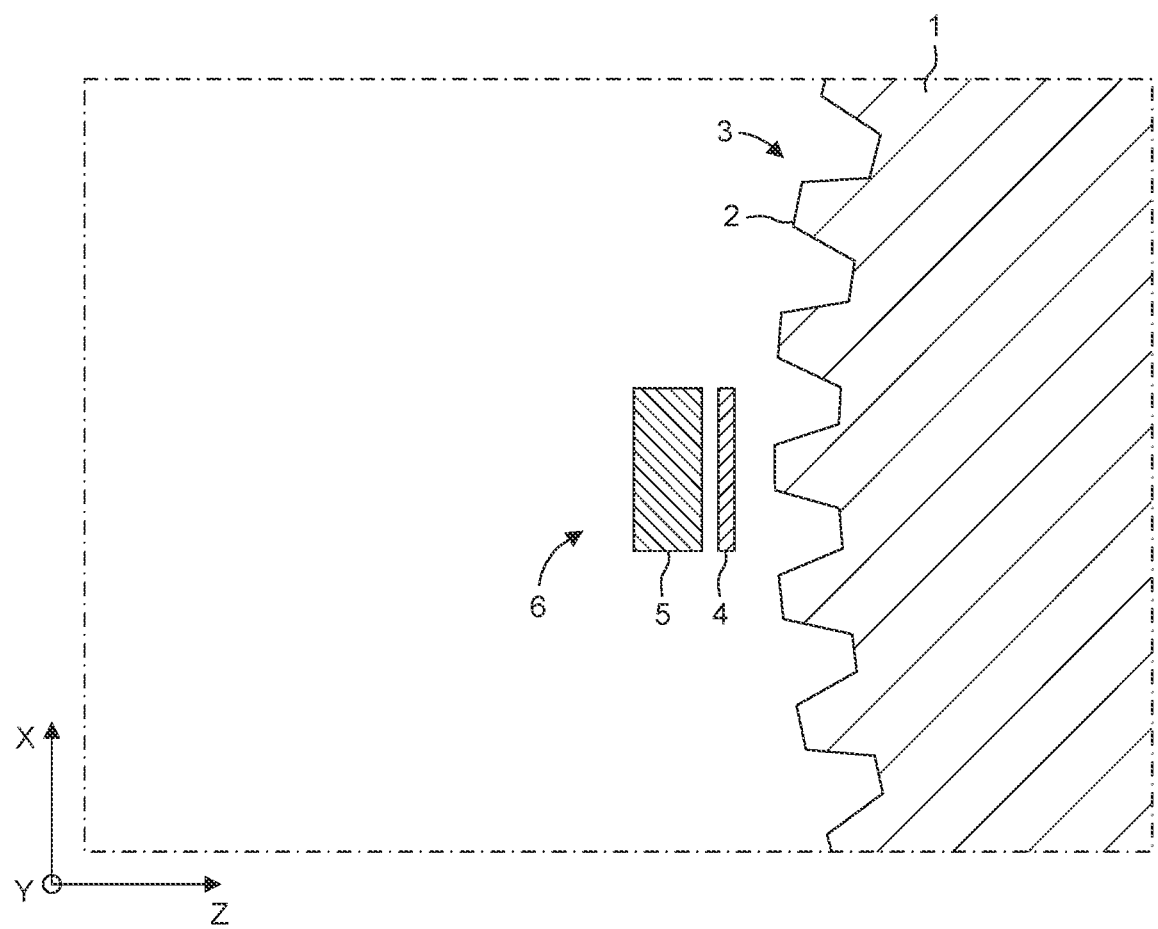
FIGS. 1A and 1B illustrate a magnetic field sensing principle of a toothed wheel according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. It is also to be understood that other embodiments may be utilized and structural or logical changes may be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Depending on certain implementation requirements, a storage medium may include a RAM, a ROM, a PROM, an EPROM, an EEPROM, a FLASH memory, or any other medium having electronically readable control signals stored thereon, which cooperate (or are capable of cooperating) with a programmable computer system such that the respective method is performed. Therefore, a storage medium may be regarded as a non-transitory storage medium that is computer readable.

Additionally, instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. A "controller," including one or more processors, may use electrical signals and digital algorithms to perform its receptive, analytic, and control functions, which may further include corrective functions.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be a speed sensor that measures a rotational speed of an object, such as a toothed wheel.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

According to one or more embodiments, a magnetic field sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with a back-bias magnet to form a sensor module, sensor device, or the like.

One or more magnetic field sensor elements, or for short sensor elements, included in the sensor package is thus exposed to the magnetic field, and the sensor signal (e.g., a voltage signal) provided by each magnetic field sensor element is proportional to the magnitude of the magnetic field, for example. Further, it will be appreciated that the terms "sensor element" and "sensing element" may be used interchangeably throughout this description, and the terms "sensor signal" and "measurement value" may be used interchangeably throughout this description.

The sensor circuit may be referred to as a signal processing circuit and/or a signal conditioning circuit that receives the signal (i.e., sensor signal) from the magnetic field sensor element in the form of raw measurement data and derives, from the sensor signal, a measurement signal that represents the magnetic field. The sensor circuit may include a digital converter (ADC) that converts the analog signal from the one or more sensor elements to a digital signal. The sensor circuit may also include a digital signal processor (DSP) that performs some processing on the digital signal, to be discussed below. Therefore, the sensor package comprises a circuit which conditions and amplifies the small signal of the magnetic field sensor via signal processing and/or conditioning.

A sensor device, as used herein, may refer to a device which includes one or more sensor elements and sensor circuit as described above. A sensor device may be integrated on a single semiconductor die (e.g., silicon die or chip), although, in other embodiments, a plurality of dies may be used for implementing a sensor device. Thus, the sensor elements and the sensor circuit are disposed on either the same semiconductor die or on multiple dies in the same package. For example, the sensor elements might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Magnetic field sensor elements include, but is not limited to, vertical Hall effect devices, or magneto-resistive sensors, often referred to as XMR sensors which is a collective term for anisotropic magneto-resistive (AMR), giant magneto-resistive (GMR), tunneling magneto-resistive (TMR), etc.

Figure 1B:
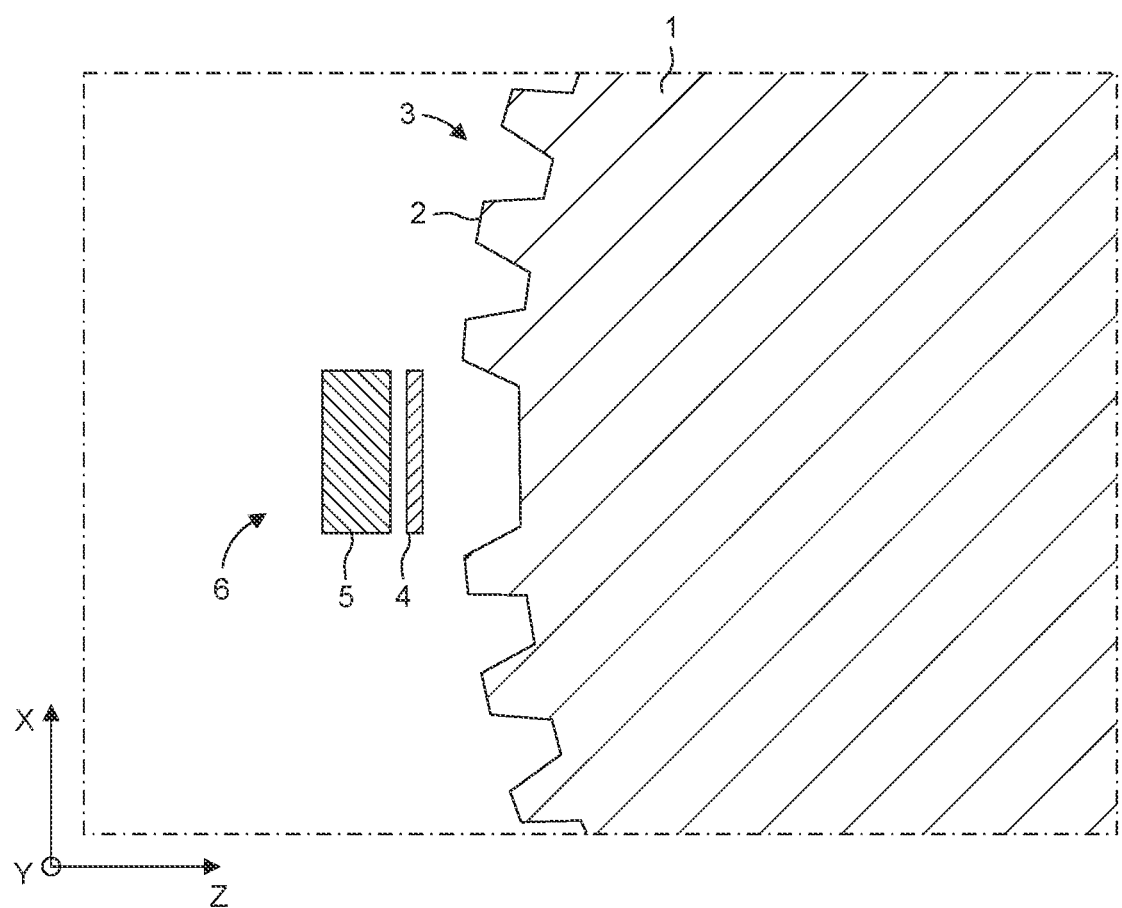

FIGS. 1A and 1B illustrate a magnetic field sensing principle of a toothed wheel 1 that has alternating teeth 2 and notches 3 according to one or more embodiments. In particular, the toothed wheel 1 may be made of a ferromagnetic material (e.g., iron) that attracts magnetic fields. In addition, a sensor 4 is configured to sense a magnetic field produced by a back-bias magnet 5, where the sensor 4 and the back-bias magnet 5 comprise a sensor module 6. The back-bias magnet 5 may be mounted to the back or rear side of the sensor die of the sensor 4 relative to the toothed wheel 1, which is placed in front of the sensor die. The sensor 4 includes one or more sensor elements that are sensitive to magnetic fields and generate sensor signals and a sensor circuit that processes the sensor signals. The sensor elements and the sensor circuit are disposed in a sensor package. The magnet 5 creates a bias magnetic field in the sensor package plane (i.e., chip plane).

Here, the sensor plane(s) of the sensor elements within the sensor 4 are arranged parallel to the in-plane components of the magnetic field. The sensor planes, as shown in FIGS. 1A and 1B, are aligned in the x and y-directions, perpendicular to each other, and represent the sensitivity-axis of the sensor elements such that the sensor elements are sensitive to the in-plane magnetic field component Bx (i.e., the magnetic field in the x-plane) or to the in-plane magnetic field component By (i.e., the magnetic field in the y-plane) of the sensor 4. Thus, the sensor elements are sensitive to the bias magnetic field produced by the magnet 5.

FIG. 1A shows a tooth 2 of wheel 1 passing the sensor module 6. In this instance, the magnetic field lines of the bias magnetic field produced by the back-bias magnet 5 are pulled in the z-direction towards the tooth 2. Thus, the magnetic field lines are pulled away from the x and y-axes (i.e., the sensor planes) and the sensed magnetic field strength in the x and y-directions is reduced such that a minimum field strength is detected at the center of the tooth 2. This may differ in real-world applications where the minimum may not occur exactly at the center due to assembly tolerances, but the minimum field strength should be detected substantially at the center of the tooth 2.

Conversely, FIG. 1B shows a notch 3 of wheel 1 passing the sensor module 6. In this instance, the magnetic field lines of the bias magnetic field produced by the back-bias magnet 5 are not pulled (or less pulled) in the z-direction towards the notch 3. Thus, the magnetic field lines remain concentrated relative to the x and y-axes (i.e., the sensor planes) and the sensed magnetic field strength in the x and y-directions are at a maximum at the center of the notch 3. This may differ in real-world applications where the maximum may not occur exactly at the center, but the maximum field strength should be detected substantially at the center of the notch 3.

As the wheel 1 rotates, the teeth 2 and notches 3 alternate past the sensor module 6 and the sensor elements within the sensor 4 sense a change in the x-axis and y-axis magnetic field strength that varies as a sinusoidal waveform (i.e., as a signal modulation), the frequency of which corresponds to a speed of rotation of the wheel, which further corresponds to a speed of rotation of a drive shaft (e.g., camshaft) that drives the rotation of the wheel. Thus, the sensor circuit of the sensor 4 that receives signals (i.e., sensor signals) from the magnetic field sensor elements and derives, from the sensor signals, a measurement signal that represents the magnetic field as a signal modulation. The measurement signal may then be output as an output signal to an external controller, control unit, or processor (e.g., an ECU) according to a preconfigured communication protocol. The external device counts the pulses of the output signal and is able to calculate wheel-speed and an actual angle of the rotating wheel.

The sensor 4 may be configured with an AK protocol for its communication protocol. The AK protocol is used for data signal transmission. It is an interface between a wheel speed sensor and the ECU. The signal generated by the sensor is processed by a signal conditioning unit to generate a speed signal and a data signal.

A data frame or a data transmission block (i.e., a protocol) of an AK signal includes a speed pulse and data protocol bits, corresponding to a speed signal and a data signal, respectively. The speed pulse reflects the structure of the wheel 1, including number of teeth/notches, pitch, etc., and the wheel speed can be calculated based on the time interval between two or more adjacent or consecutive speed pulses of the data transmission signal. Essentially, the frequency at which the speed pulses are generated corresponds to the wheel speed. The data protocol bits represent other additional information, such as rotation direction, field amplitude, etc. The sensor transmits data by changing the magnitude of the AK signal, which is a modulated current. The current is divided into three levels. A high-level current, generally 28 mA, used for speed pulse; a medium-level current, generally 14 mA, used for data protocol bits; and a low-level current, generally 7 mA, used to indicate the low level in the signal. Thus, a protocol generator of the sensor 4 modulates an output current to generate the AK signal, which has different signal levels for encoding different information onto the signal.

The sensor circuit of the sensor 4 may evaluate a sensor signal or a differential sensor signal generated by its sensor elements as an input sensor signal by comparing the input sensor signal to a zero threshold. An input sensor signal is said to have a zero-crossing when its signal value (amplitude) is equal to zero as the input sensor signal oscillations between two extrema values. Thus, the sensor circuit can detect a zero-crossing by comparing the input sensor signal to a zero threshold. The comparison may be valid for when the sensor signal is decreasing (e.g., a falling edge transition), when the sensor signal is increasing (e.g., a rising edge transition), or for both. It will also be appreciated that other threshold values, referred to as trigger thresholds, different than zero may also be used. For example, a trigger threshold may be set at a predetermined magnitude, where the predetermined magnitude corresponds to a certain angular value (rotational position) or incremental angular values (e.g., every 10°) of the wheel 1. Thus, the sensor 4 may trigger a protocol (data frame or transmission block) upon detecting one or more predetermined threshold crossings of the sensor signal, which may correspond to zero-crossing events and/or angular-threshold-crossing events that occur periodically as the wheel 1 rotates.

When the sensor circuit of the sensor 4 detects a threshold crossing of the input sensor signal (e.g., the magnetic field is detected at a predetermined value), it outputs a speed pulse with a pulse width tp. After the speed pulse, there is a maximum of 9 data units with each data unit representing 1 bit of data. The duration of each data unit is also tp. Additionally, there is a time interval of tp/2 between the speed pulse and the first data unit of the data protocol bits.

Figure 2:
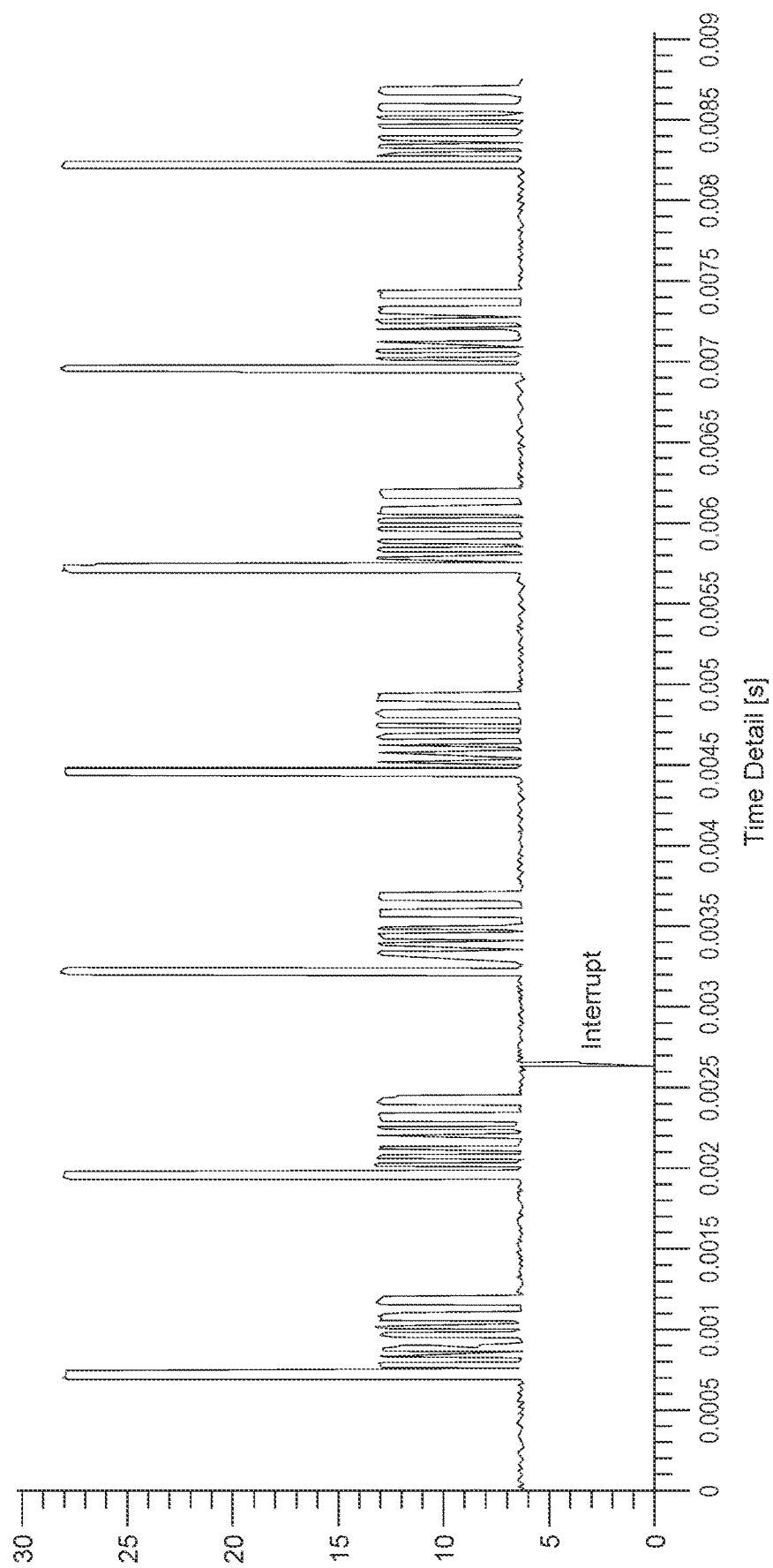
FIG. 2 shows a signal waveform of a data signal transmission according to an AK protocol according to one or more embodiments.

FIG. 2 shows a signal waveform of a data signal transmission according to an AK protocol according to one or more embodiments. The data signal includes speed pulses, each of which are followed by a set of data protocol bits (e.g., N data protocol bits, wherein N is in integer).

Figure 3:
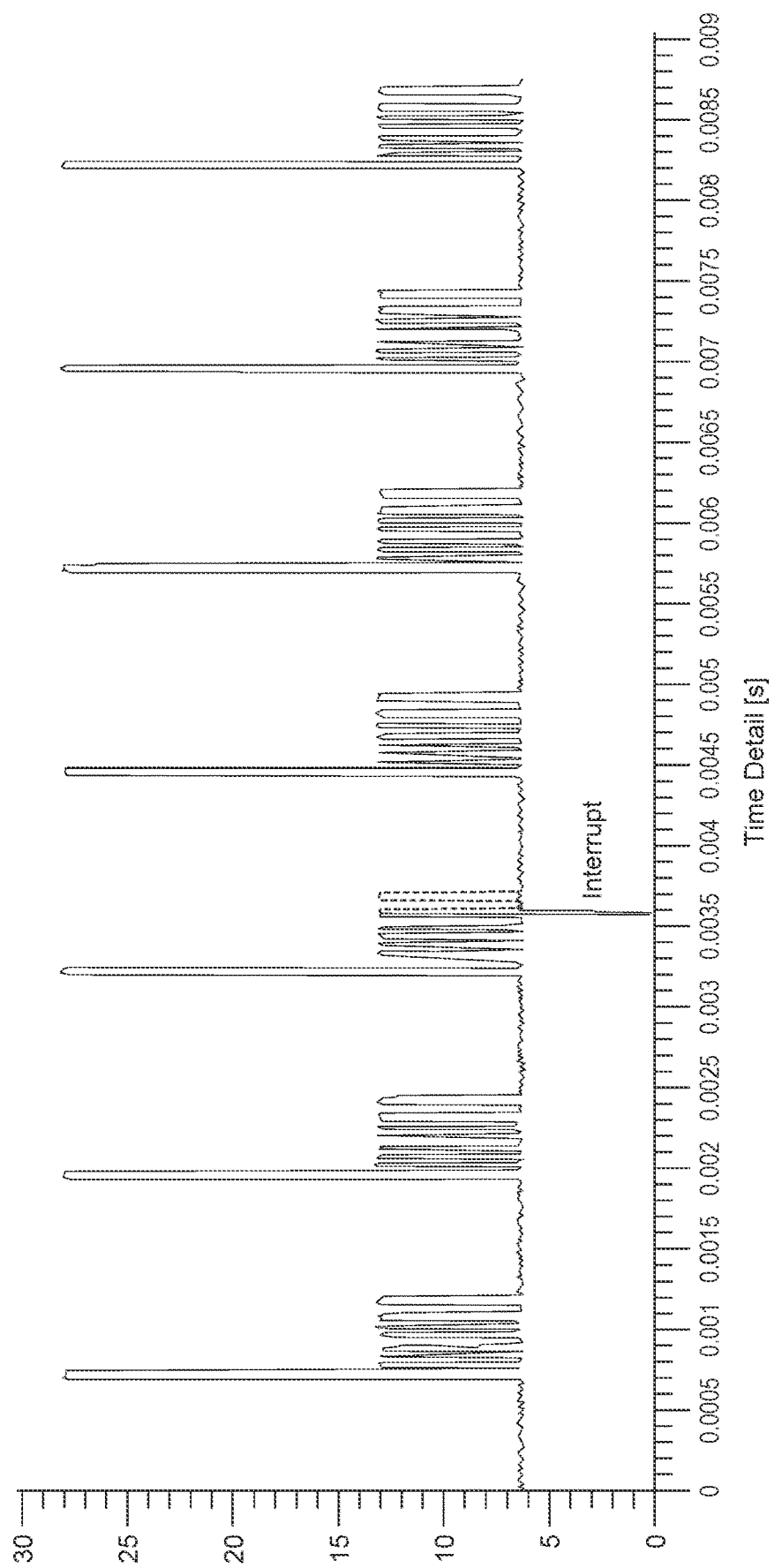
FIG. 3 shows a signal waveform of a data signal transmission according to an AK protocol during which an interrupt (i.e., a microbreak (MB) event) occurs during a transmission of the data protocol bits.

FIG. 3 shows a signal waveform of a data signal transmission according to an AK protocol during which an interrupt (i.e., a microbreak (MB) event) occurs during a transmission of the data protocol bits. The interrupt is represented by a sharp decrease on the output current (i.e., the current is interrupted and goes to zero). This interrupt is also shown in FIG. 2, but during the pre-low time between protocols (i.e., between data frames or data blocks) and therefore does not affect a transmission of a data frame or data block and no loss of information is incurred. In contrast, FIG. 3 illustrates the interrupt disrupting an ongoing transmission of a data frame or a data block, which may result in a loss of information.

Figure 4:
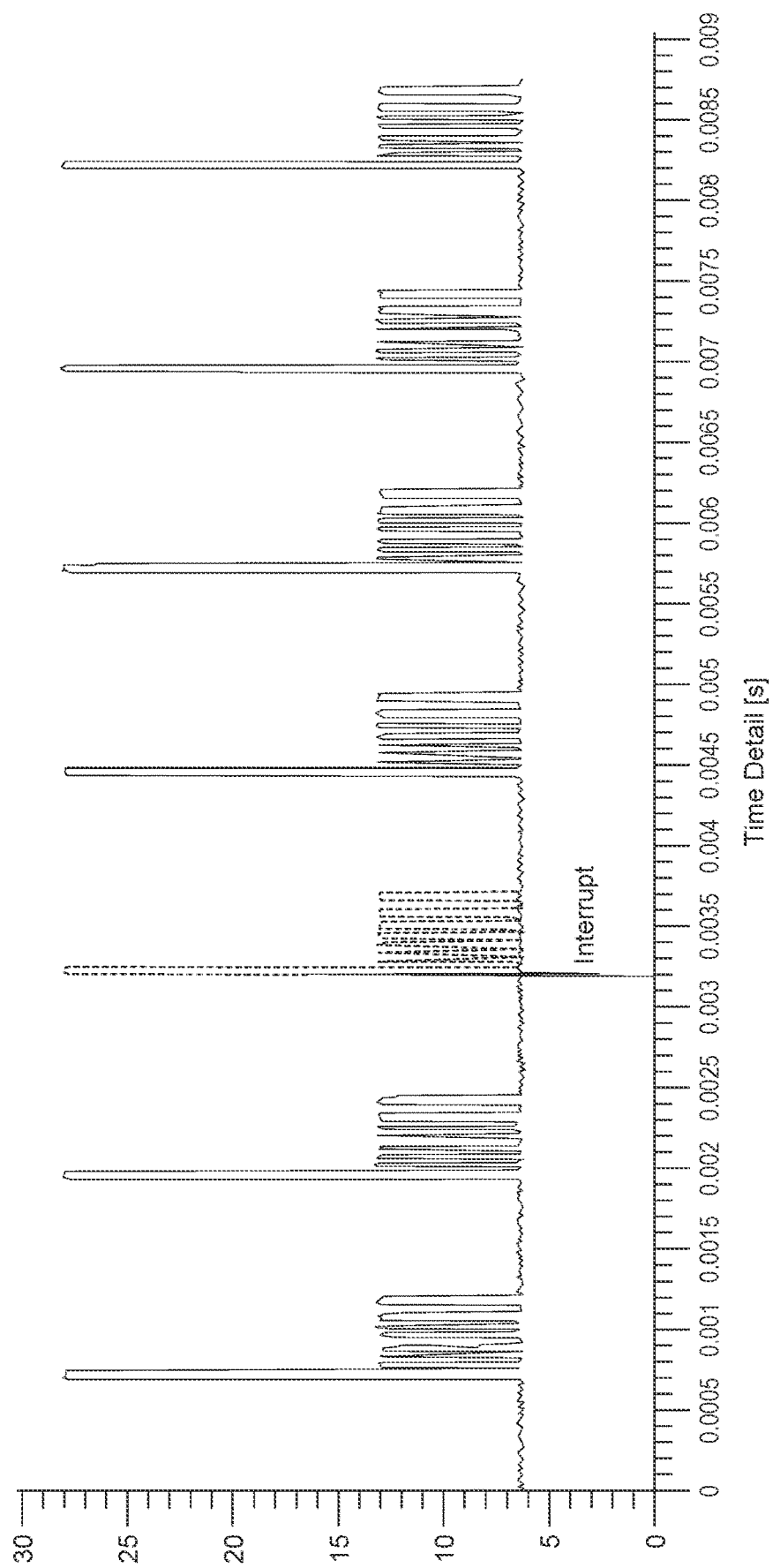
FIG. 4 shows a signal waveform of a data signal transmission according to an AK protocol during which an interrupt (i.e., an MB event) occurs during a transmission of the speed pulse.

FIG. 4 shows a signal waveform of a data signal transmission according to an AK protocol during which an interrupt (i.e., an MB event) occurs during a transmission of the speed pulse. Here, the entire protocol (data frame or transmission block) is interrupted. Thus, if an MB event occurs immediately after the pre-low time, the entire protocol (data frame or transmission block) is lost.

Embodiments include the following additional features.

At high signal frequencies, the time between two consecutive magnetic threshold crossings (e.g., zero-crossings) is not big enough to send a full AK protocol (28 mA pulse followed by nine 7/14 mA modulated data bits).

Trailing bits are cut off by the next 28 mA speed pulse.

To allow the last bit of the previous protocol (data frame or transmission block) to finish there is a "pre-low" time in front of every 28 mA speed pulse. This pre-low time represents a time delay between a magnetic threshold crossing and the start of a protocol (data frame or transmission block). Accordingly, there is a small, predetermined delay between detecting a threshold crossing and the start of the transmission of the protocol (data frame or transmission block) triggered by the threshold-crossing. In the case of the AK protocol, the predetermined delay is the time between detecting a threshold crossing and the start of the speed pulse triggered by the threshold-crossing.

When a magnetic threshold crossing is detected, the information that a protocol (data frame or transmission block) is about to be sent is stored in a microbreak (MB) register as an untriggered "untrig" bit. Specifically, the untrig bit is stored in an untriggered "untrig" register of the MB registers. In other words, the untrig bit is set to one when a magnetic threshold crossing is detected but the protocol (i.e., a respective speed pulse and data protocol bits) has not yet been sent or has only been partially sent. At a minimum, the untrig bit is set to one during the entire duration of the pre-low time and the amount of time that the untrig bit is set to one may extend into the protocol.

Accordingly, the untrig register is a transmission block status register configured to store the untrig bit as a transmission block status bit or, more generally, as transmission block status information indicative of whether or not one of the data transmission blocks has been triggered for transmission. Thus, in the event of a current supply interruption prior to the transmission of the protocol or during partial transmission of the protocol, the untrig bit can be used as an indication that the protocol was not transmitted or not sufficiently transmitted (i.e., not sent when untrig=1) and needs to be sent or resent once the current supply interruption is over and current supply has been restored. The untrig bit is set to zero after one or more conditions described below has been met. If the untrig bit is set to zero, the sensor 4 determines that a protocol does not need to be transmitted or resent when the current supply interruption is over. Thus, the sensor 4 can determine from the value of the untrig bit a status (e.g., in response to restoration of the current supply following a current supply interruption) and what type of action should be taken in response to detecting a current supply interruption or other interrupt that disrupts the transmission of the protocol. These actions are also described in greater detail below.

The "pre-low" time starts when a threshold crossing is detected. The untrig bit is also set to "1" when a threshold crossing is detected. This pre-low time may be referred to as a pre-transmission time that has a predetermined duration, after which a corresponding data transmission block is transmitted starting with its speed pulse.

Figure 5:
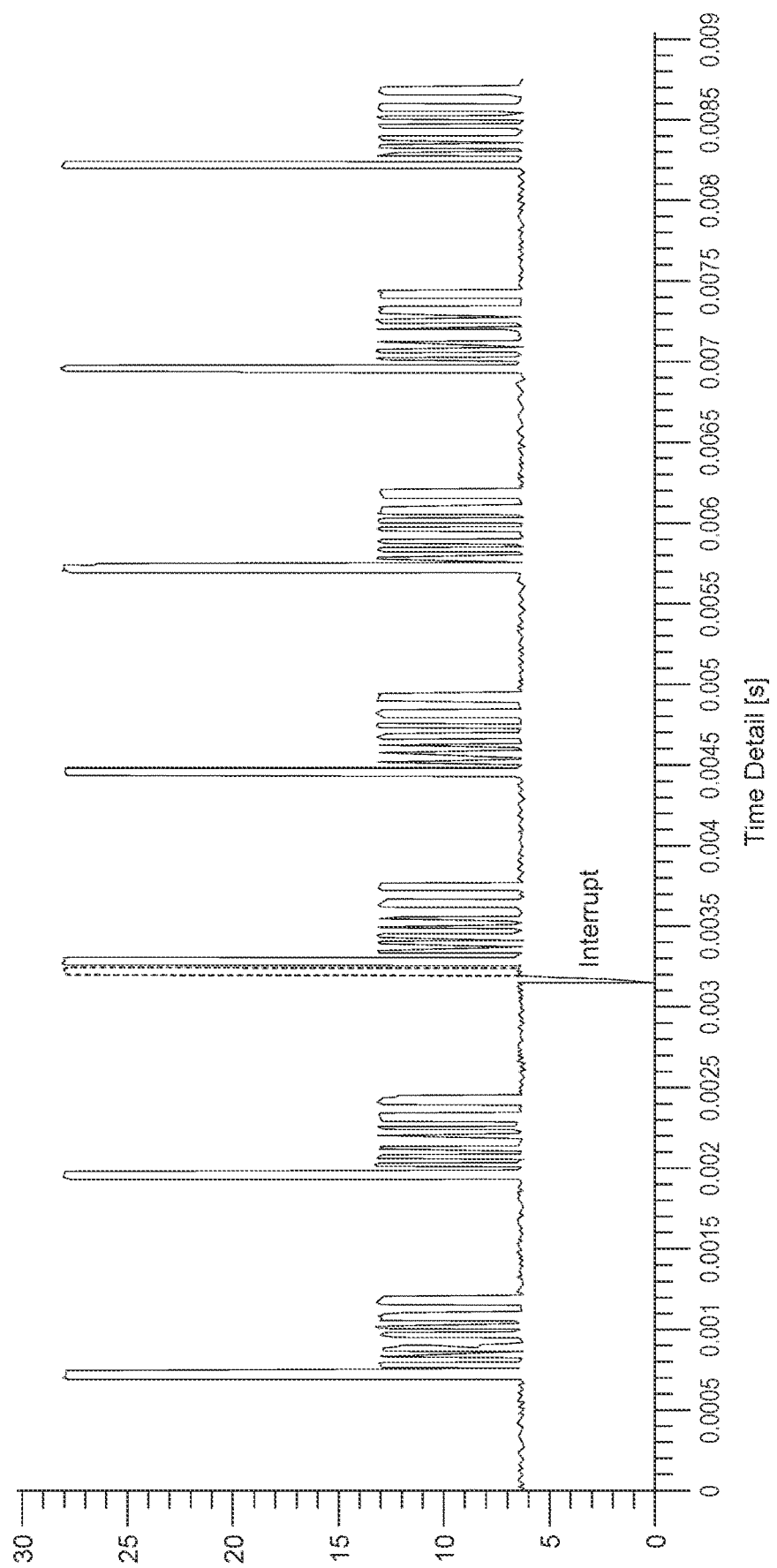
FIG. 5 shows a signal waveform of a data signal transmission according to an AK protocol during which an interrupt (i.e., an MB event) occurs during a pre-low time before a speed pulse according to one or more embodiments.

If a MB event occurs inside of the pre-low time (i.e., prior to any transmission of the protocol, the protocol (data frame or transmission block) is fully repeated after recovery of the supply current. FIG. 5 shows a signal waveform of a data signal transmission according to an AK protocol during which an interrupt (e.g., an MB event) occurs during a pre-low time before a speed pulse. The protocol (speed pulse and data protocol bits) is fully repeated in such a scenario. When the pre-low time is over, the protocol is triggered and the "untrig" bit is set to zero—indicating that the protocol has been triggered (e.g., the speed pulse has been triggered to start the protocol transmission). The storing of a value of 1 in the untrig bit is extended into a reference protocol. For example, the value of the untrig bit may be maintained at 1 until some preconfigured time extended into the protocol, such as into a portion of the speed pulse, until the falling edge of the speed pulse, or into a portion of the data protocol bits. When the storage interval expires, the value of the untrig bit is set to zero. The preconfigured time should be short enough, however, to allow a full transmission of the unsent or partially sent protocol without interfering with the next protocol.

As a result, the storage time of the "untrig" bit as a value of one is extended into the 28 mA speed pulse of the protocol (data frame or transmission block). The percentage by which the speed pulse is covered is a degree of freedom and can be adapted to the application circuit.

With this extended time, the complete loss of protocols (frames or transmission blocks) is avoided. In the worst case, only a fraction of the 28 mA speed pulse is transmitted. The delay time in front of a retriggered protocol (data frame or transmission block) can be adapted to signal additional information to the ECU. Also, the information that the MB event occurred inside of the 28 mA speed pulse can be stored to adapt the delay time in front of the pulse. In a more enhanced implementation, the 28 mA speed pulse of the re-triggered 28 mA speed pulse can be reduced. In this solution, the overall 28 mA-pulse-length tp would still meet the AK protocol specification and only show a short supply loss.

FIGS. 6A-6F illustrates timing schemes of a data signal transmission according to an occurrence of an interrupt event, denoted by a bolt symbol, using the AK protocol according to one or more embodiments. Here, the speed pulse is represented by a large amplitude and the data bits are displayed as a block of mid value following the speed pulse in order to simplify the drawings. Time t1 is the switching time point of a speed comparator of the sensor 4 (i.e., a time when a threshold crossing is detected). The untrig bit is set to 1 at time t1. Time t2 is a cutoff time at which the value of the untrig bit is switched from 1 to 0. Time t2 is configured to extend into the reference protocol, and thus may be referred to as "prolonged." The difference between time t2 and t1 is a preconfigured interval during which the untrig bit is set to 1. The timing schemes implement the prolonged storage of the "untrig" bit for used in the event of an interrupt.

In particular, the timing schemes show the signal levels of a reference signal that would be generated if an interrupt event (e.g., an MB event) does not occur and signal levels of an actual signal (i.e., a disturbed signal) generated when an interrupt event does occur. The reference signal may also be referred to as a reference protocol (reference frame or reference transmission block) and the disturbed signal may be referred to as a disturbed protocol (disturbed frame or disturbed transmission block).

FIGS. 6A-6F are used to show the protocol response in light of an interrupt event occurring at different time instances during signal generation/transmission.

Figure 6A:
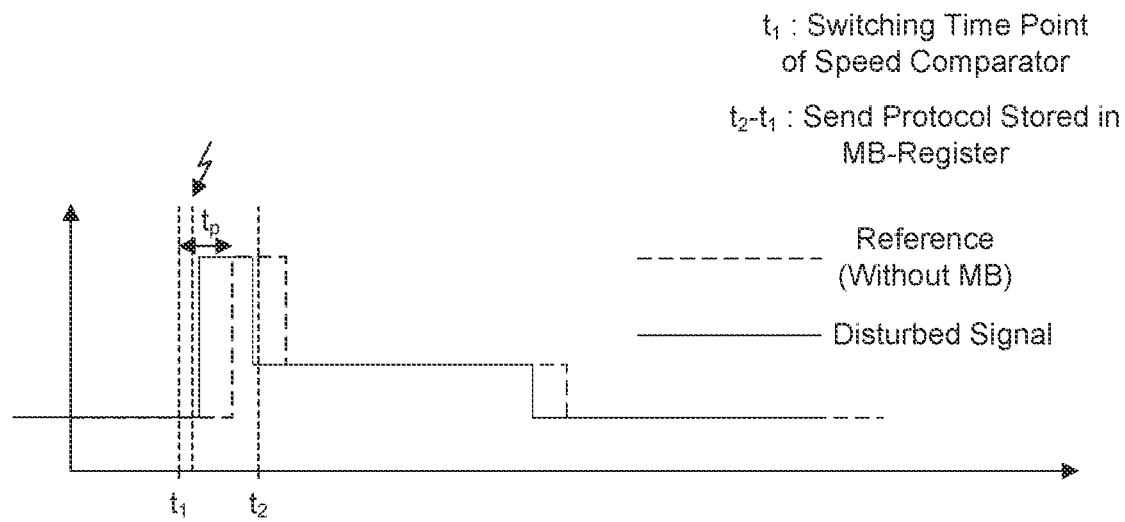
FIGS. 6A-6F illustrates a prolonged storage of the "untrig" bit in the event of an interrupt, denoted by a bolt symbol, according to one or more embodiments.

FIG. 6A illustrates a scenario in which an MB event occurs while an untriggered protocol was stored (i.e., untrig bit=1) during the pre-low time. As a result, the protocol (data frame or transmission block) is sent immediately after recovery of the supply current, slightly ahead of reference signal.

Figure 6B:
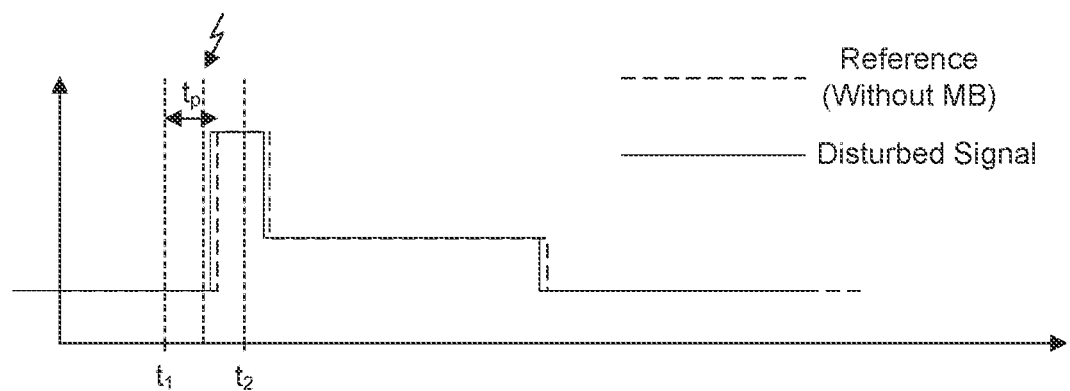

FIG. 6B illustrates a scenario in which an MB event occurs while an untriggered protocol was stored (i.e., untrig bit=1) during the pre-low time, slightly before the reference signal would have been triggered if an interrupt event would not have occurred. Similar to the scenario of FIG. 6A, the protocol (data frame or transmission block) is sent immediately after recovery of the supply current, slightly ahead of reference signal.

Figure 6C:
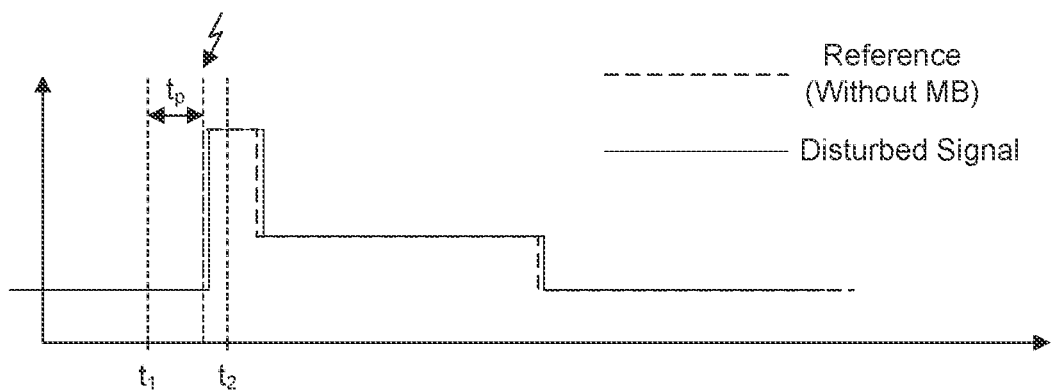

FIG. 6C illustrates a scenario in which an MB event occurs while an untriggered protocol was stored (i.e., untrig bit=1) and at a time instance that the reference signal is triggered (i.e., at the rising edge of the speed pulse). Because the untrig bit is still set to 1, the protocol will be transmitted once the current supply is recovered, thereby preventing loss of the full protocol.

Figure 6D:
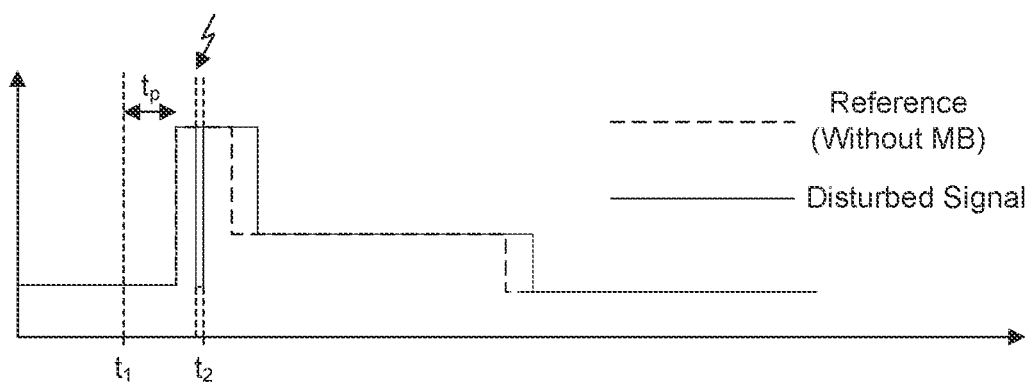

FIG. 6D illustrates a scenario in which an MB event occurs while the speed pulse is being transmitted and while an untriggered protocol was stored (i.e., untrig bit=1). Here, a "stump" of the already started protocol can be seen. After recovery of the current supply, the full protocol is repeated because the untrig bit is still set to 1.

Figure 6E:
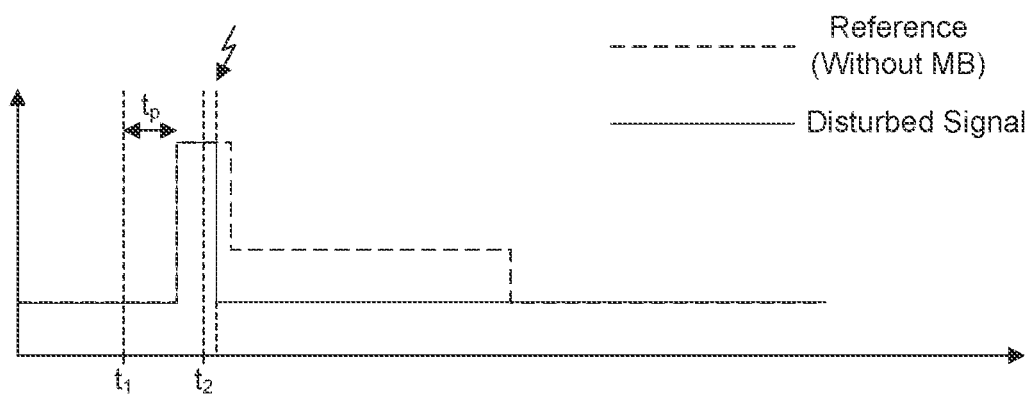

FIG. 6E illustrates a scenario in which an MB event occurs at the falling edge the speed pulse. Here, the storage time for the untrig bit has been exceeded and has been set to zero (i.e., untrig bit=0). As a result, the protocol is cutoff and is not repeated or completed.

Figure 6F:
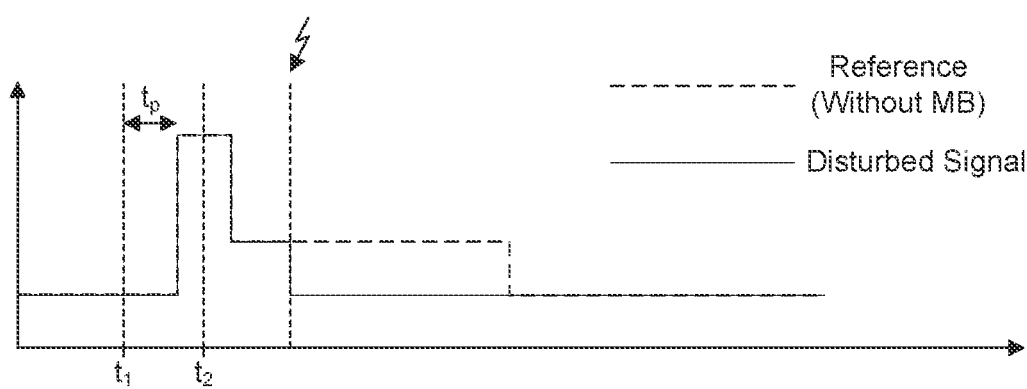

FIG. 6F illustrates a scenario in which an MB event occurs during the transmission of the data protocol bits. Here, the storage time for the untrig bit has been exceeded and has been set to zero (i.e., untrig bit=0). As a result, the protocol is cutoff and is not repeated or completed.

Figure 7A:
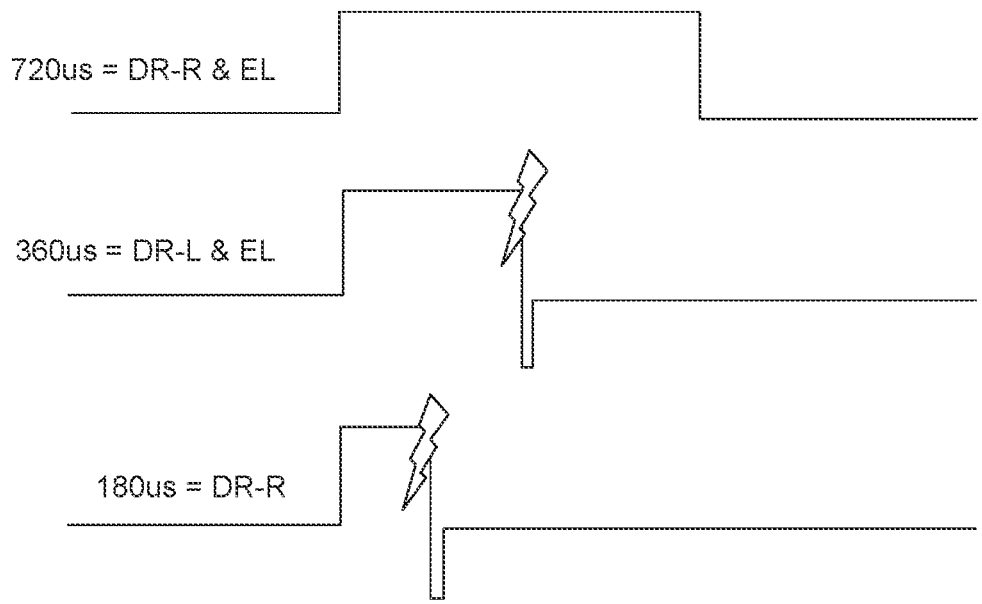
FIG. 7A illustrates a PWM data signal transmission protocol.

FIG. 7A illustrates a PWM data signal transmission protocol. Similar to the AK protocol, embodiments can be directed to a PWM protocol to avoid wrong pulses on the ECU side. If a delivered pulse (in this example of a length of 720 μs) is delivered, and interrupted by an ESD event or microbreak event, then the pulse length would be wrongly detected on ECU side because the pulse length has been shortened due to the interrupt. In a worst case, the pulse could be interpreted by the ECU as a pulse with 360 μs length or a 180 μs length, which conveys the wrong information.

Different codes are encoded by different pulse lengths. For example, direction right (DR-R), direction left (DR-L), direction right with warning (DR-R & EL), and direction left with warning (DR-L & EL), may each have different assigned pulse lengths. The warning aspect may indicate that the absolute value of a sensed amplitude of the sensor signal is small (e.g., below a warning threshold). For example, the sensor 4 may detect that an extremum of the sensor signal is less than an expected value, indicating a possible error. For example, a sensor signal that is too small may indicate that the mounting position of the sensor 4 relative to the wheel 1 may be too large.

Figure 7B:
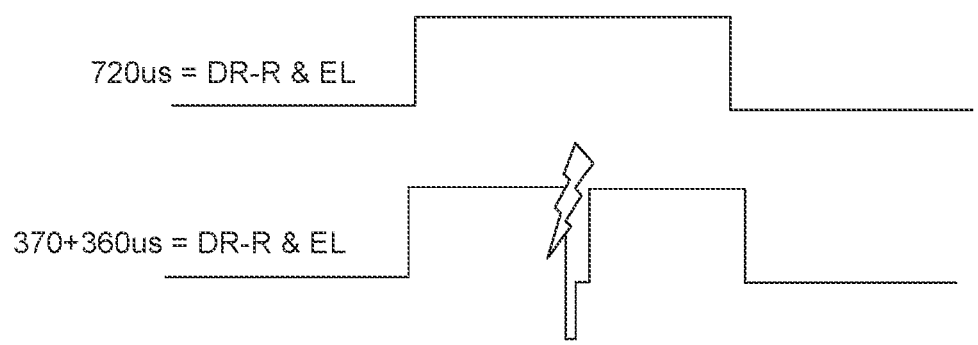
FIG. 7B illustrates a PWM data signal transmission protocol according to one or more embodiments.

FIG. 7B illustrates a PWM data signal transmission protocol according to one or more embodiments. With the proposed solution of the disclosed embodiments, the sensor could recover quickly from the microbreak and also deliver the correct pulse length. The short microbreak might be filtered from the ECU using an R/C-filter or similar solution. According to this example, the detected pulse from the ECU would then be detected as a pulse of 730 μs and still be recognized as a 720 μs pulse by the ECU with the correct information.

In FIG. 7B, a pulse length of 720 μs is intended to be transmitted by the sensor 4 in its data signal to convey PWM coded information. If no interrupt event occurs, the pulse is transmitted correctly (top). However, if an interrupt event occurs during transmission of the pulse, the pulse is interrupted and there is a short pulse loss (bottom). The sensor 4 monitors the amount of time from the start of the pulse to the end of the pulse, e.g., using a counter. During the interrupt event, the counter stops. Once the supply current has recovered from the interrupt event, counter resumes and the sensor 4 continues to generate the pulse for the amount of time remaining for the target pulse length (e.g., 720 μs). Assuming the supply current is interrupted for 10 μs in this example, the interval from the start of the first portion and the end of the second portion of the pulse would span 730 μs. The ECU may be configured with "tolerance bands" that can essentially tolerate short interruptions. For example, the ECU can be configured to detect that a short interrupt occurred (the interrupt is less than a predetermined pre-low time between protocols), and detect the full interval of the intended pulse (e.g., by discarding the interrupt interval and adding the lengths of the two pulse portions together (=720 μs).

Figure 8:
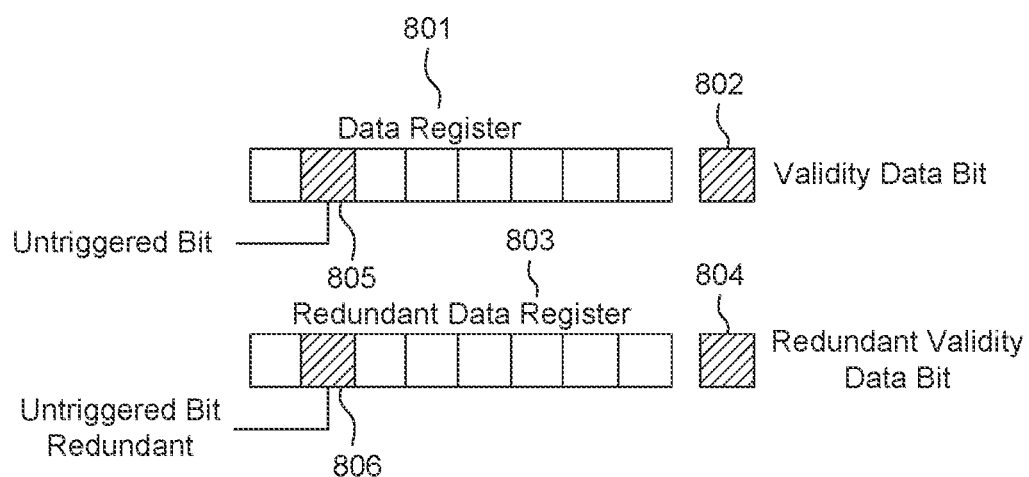
FIG. 8 illustrates a structure of microbreak registers, which includes a data register, a validity bit register, a redundant data register, a redundant validity bit register, an untrig register included in the data register, and a redundant untrig register included in the redundant data register according to one or more embodiments.

FIG. 8 illustrates a structure of microbreak registers of a sensor, which includes a data register 801, a validity bit register 802, a redundant data register 803, a redundant validity bit register 804, an untrig register 805 included in the data register 801, and a redundant untrig register 806 included in the redundant data register 803 according to one or more embodiments. During the normal functionality, the data registers 801 and 803 are continuously written together. Once the data register 801 is written, the validity bit 802 is written indicating that the data register 801 has been successfully written. Likewise, once the data register 803 is written, the validity bit 804 is written indicating that the data register 803 has been successfully written. The validity bit register is designed in order to have a systematic lower storage time than the data bit: this ensures that if the validity bit has a valid value, the data registers have a valid content. The data registers 801 as well as the validity register 802 are duplicated (redundant register), in order to have always a valid copy of the information available. The untrig register 805 stores the untrig bit as either "1" or a "0". As noted above, untrig bit is set to "1" when a magnetic threshold crossing is detected but the protocol (i.e., a respective speed pulse and data protocol bits) has not yet been sent or has only been partially sent by the sensor 4. The untrig bit is set to "0" after a full protocol has been sent by the sensor 4.

Figure 9:
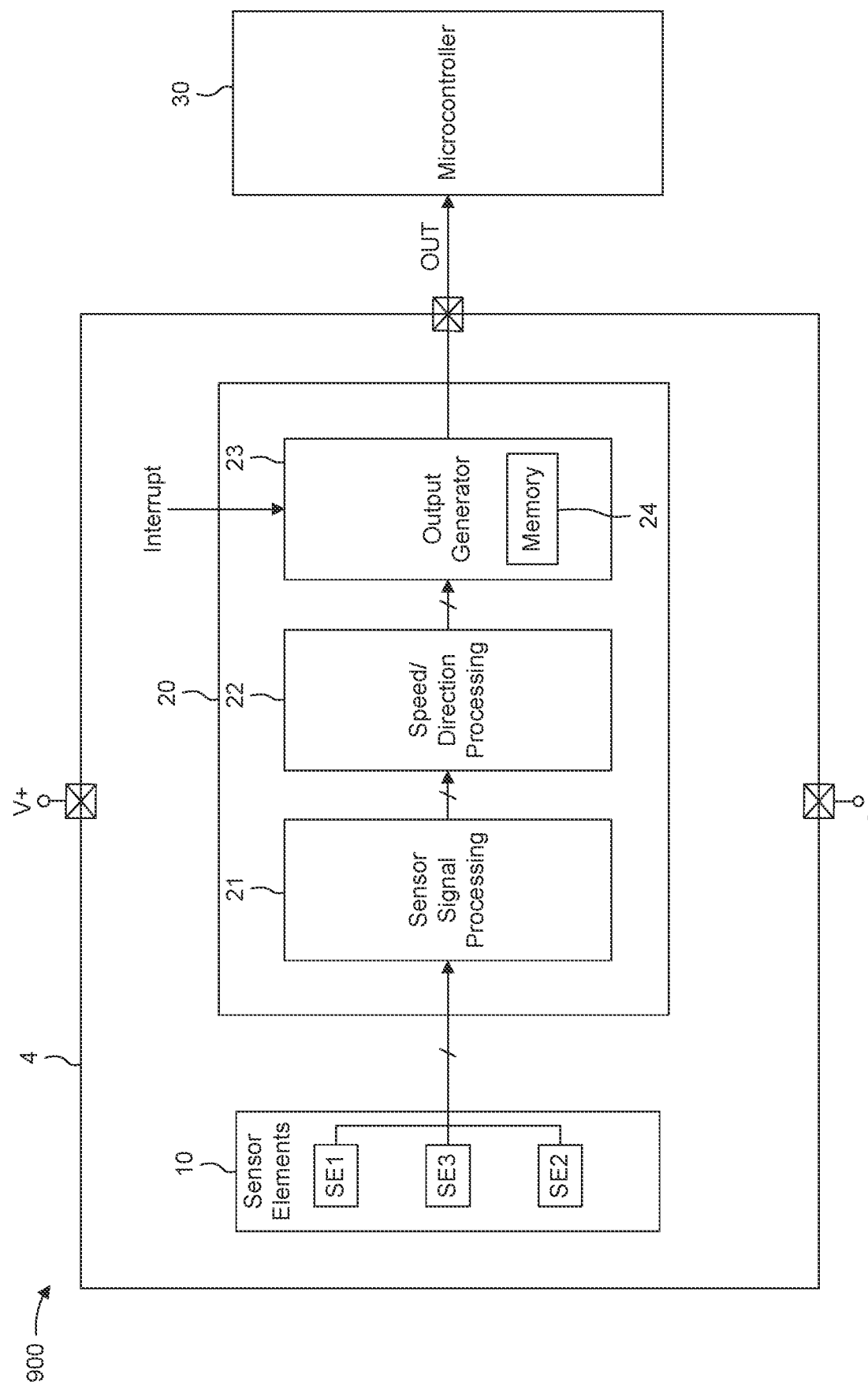
FIG. 9 illustrates schematic block diagram of a sensor system according to one or more embodiments.

FIG. 9 is a schematic block diagram of a sensor system 900 including a speed magnetic sensor according to one or more embodiments. The sensor system 900 includes magnetic speed sensor 4, which is represented by sensor chip. The sensor system 900 also includes an external device 30, such as a microcontroller or an ECU that is communicatively coupled to the sensor 4 and configured to receive data signal transmissions therefrom.

The magnetic speed sensor 4 is configured to generate at least a data signal as an output signal OUT and the microcontroller 30 is configured to receive the output signal OUT for additional analysis and/or processing.

As described above, the data signal may be an AK signal that includes data frames or data transmission blocks (i.e., protocols), with each data frame or data transmission block including a speed pulse and data protocol bits, corresponding to a speed signal and a data signal, respectively. The speed pulse reflects the structure of the wheel 1, including number of teeth/notches, pitch, etc., and the wheel speed can be calculated based on the time interval between two or more adjacent or consecutive speed pulses. The data protocol bits represent other additional information, such as rotation direction, field amplitude, etc. The magnetic speed sensor 4 transmits data (i.e., the speed pulse and data protocol bits) by changing the magnitude of the AK signal, which is a current. Alternatively, the output signal OUT may be a PWM signal.

The magnetic speed sensor 4 includes one or more magnetic field sensor elements 10, which may include sensor elements SE1, SE2, and SE3 that are linearly arranged in a line that is parallel to a tangent line of the target object. In other words, a tooth or a notch will sequentially pass the sensor elements SE1, SE3, and SE2 as the target object rotates. The sensor elements sense a change in the magnetic field strength that varies (oscillates) as a sinusoidal waveform (i.e., as a signal modulation) modulated by a rotating target object. Thus, each sensor element generates a sinusoidal sensor signal as the target object rotates, with a phase shift relative to the other sensor signals based on the spacing between the sensor elements. Each sinusoidal waveform has frequency that corresponds to a speed of rotation of the rotating target object, such as a wheel or drive shaft. A single magnetic field sensor element may be used in a monocell configuration. Additionally, or alternatively, two or more magnetic field sensor elements may be used in a differential configuration. In the latter case, two magnetic field sensor elements may by used as a differential pair such that their sensor signals are combined in a way that is robust against external stray magnetic fields.

The magnetic speed sensor 4 includes a sensor circuit 20 that includes a sensor processing circuit 21 configured to receive the analog sensor signals from the sensor elements 10, and perform signal processing and/or conditioning thereon. The analog sensor signals may be individually received from each sensor element, or may be generated from each differential pair as speed measurement signals and direction signals, respectively. If the sensor elements 10 are coupled in a differential configuration, such as a bridge circuit, the sensor processing circuit 21 includes the corresponding differential circuitry. If the analog sensor signals are from individual sensor elements, the sensor processing circuit 21 may also generate the speed measurement signals by applying differential calculus thereto. The sensor processing circuit 21 may also include analog-to-digital converters (ADCs) that convert the analog sensor signals into digital sensor signals.

The processed sensor signals are output from the sensor processing circuit 21 and provided to a speed and direction processing circuit 22. In this example, the speed and direction processing circuit 22 may receive a speed measurement signal from a differential pair of sensor elements SE1 and SE2, as well as a direction measurement signal from a monocell sensor element SE3. The speed and direction processing circuit 22 evaluates the magnitude of the speed measurement signal (e.g., via comparison) to one or more trigger thresholds to trigger speed pulses. The speed and direction processing circuit 22 may also evaluate the phase relationship between the speed measurement signal and the direction measurement signal to determine a rotation direction of the rotating target object.

For example, the speed measurement signal and the direction measurement signal should be sinusoidal waveforms that have the same frequency but may be 90° phase-shifted from each other with a positive phase shift of a negative phase shift depending on the rotation direction of the target object. For example, a positive 90° phase-shift may indicate a clockwise rotation and a negative 90° phase-shift may indicate a counter-clockwise rotation, or vice versa. The speed and direction processing circuit 22 may determine the rotation direction based on whether the 90° phase-shift between the speed measurement signal and the direction signal is positive or negative.

The output generator 23 generates pulsed output signal OUT based on the evaluation on the speed and direction measurement signals performed by the speed and direction processing circuit 22.

In particular, the output generator 23 may include a current modulator, also referred to as a protocol generator, that receives information on the threshold crossings and the phase relationships described above and generates the pulsed output signal OUT as an output current according to a programmed current switching protocol or rule set built out of, for example, comparators. The output current may be between at least two current values in order to generate current pulses. The frequency of the speed pulses is directly related to the rotational speed of the target object with the speed pulses being triggered when the speed measurement signal crosses one or more trigger thresholds on a rising transition, a falling transition, or both. The output generator 23 also generates data protocol bits following each speed pulse in order to transmit additional information, such as rotation direction, field amplitude, etc. The output generator 23 also accesses the microbreak registers stored in memory 24, including the untrig register 805, and monitors for and detects interrupts to the current supply or other an interrupt event that disrupts the transmission of output signal OUT. If the output generator 23 detects an interrupt, the output generator 23 evaluates the untrig bit stored in the untrig register 805 and performs an action with respect to the transmission of output signal OUT based on the timing schemes of the data signal transmission described above. The microcontroller 30 receives and decodes the output signal OUT.

While the above embodiments are described in the context of detecting a wheel or camshaft speed, the sensor may be used to detect the rotation speed of any rotating member or object that creates sinusoidal variations in a magnetic field as it rotates and that may be sensed by a sensor, including a crankshaft and transmission speed sensing. For example, a combination of a ferrous wheel and a back-bias magnet may be used to generate a time varying magnetic field.

Further, while various embodiments have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A magnetic sensor configured to detect a rotation of an object, comprising:
   at least one sensor element configured to generate at least one sensor signal based on a magnetic field that is modulated by the rotation of the object;
   a sensor circuit configured to generate a data transmission signal based on the at least one sensor signal, wherein the data transmission signal comprises a plurality of data transmission blocks; and
   a memory comprising a transmission block status register configured to store transmission block status information indicative of whether or not one of the plurality of data transmission blocks has been triggered for transmission,
   wherein the sensor circuit is configured to:
      determine that a data transmission block, of the plurality of data transmission blocks, is about to be transmitted;
      detect an interrupt event that disrupts a transmission of the data transmission signal;
      determine, based on the transmission block status information, that the data transmission block has been triggered for transmission prior to the interrupt event; and
      cause, based on a conclusion of the interrupt event, at least a portion of the data transmission block to be transmitted to avoid a complete loss of the data transmission block due to the detected interrupt event based on the transmission block status information present at a time the interrupt event is detected.

2. The magnetic sensor of claim 1, wherein the data transmission signal is a modulated current and the interrupt event is a current supply interruption that disrupts the transmission of the data transmission signal.

3. The magnetic sensor of claim 2, wherein the sensor circuit comprises a protocol generator configured to generate the data transmission signal according to a transmission protocol.

4. The magnetic sensor of claim 3, wherein the transmission protocol is a current modulation protocol.

5. The magnetic sensor of claim 3, wherein the data transmission signal is an AK signal.

6. The magnetic sensor of claim 5, wherein the sensor circuit is configured to perform an evaluation of the at least one sensor signal and generate the data transmission signal based on the evaluation of the at least one sensor signal, wherein each data transmission block has a protocol configuration comprising a speed signal portion and a data signal portion combined according to a transmission protocol, wherein the speed signal portion corresponds to a rotational speed of the object and the data signal portion provides additional information, wherein the speed signal portion of a respective data transmission block is a speed signal pulse and the data signal portion of a respective data transmission block comprises at least one data unit, each data unit signaling a data bit.

7. The magnetic sensor of claim 3, wherein the sensor circuit is configured to perform an evaluation of evaluate the at least one sensor signal and generate the data transmission signal based on the evaluation of the at least one sensor signal, wherein each data transmission block has a protocol configuration comprising a speed signal portion and a data signal portion combined according to a transmission protocol, wherein the speed signal portion corresponds to a rotational speed of the object and the data signal portion provides additional information, wherein the data transmission signal is a pulse width modulation (PWM) signal, wherein the speed signal portion and the data signal portion are encoded into a pulse width of a respective data transmission block.

8. The magnetic sensor of claim 1, wherein:
   the sensor circuit is configured to compare a sensor signal of the at least one sensor signal or a differential sensor signal derived from the sensor signal to a trigger threshold, and
   in response to detecting a threshold crossing of the sensor signal or the differential sensor signal with the trigger threshold, the sensor circuit is configured to set the transmission block status information to indicate a first status and trigger a corresponding data transmission block for transmission.

9. The magnetic sensor of claim 8, wherein, in response to detecting the interrupt event:
   the sensor circuit is configured to transmit at least a portion of the corresponding data transmission block after the detected interrupt event has passed on a condition that the transmission block status information indicates the first status at the time the interrupt event is detected, and
   the sensor circuit is configured to delay transmitting information on the data transmission signal after the detected interrupt event has passed until a next data transmission block is triggered for transmission on a condition that the transmission block status information indicates a second status at the time the interrupt event is detected.

10. The magnetic sensor of claim 9, wherein the sensor circuit is configured to set the transmission block status information to indicate the first status for a predetermined time interval and then set the transmission block status information to indicate the second status upon a lapse of the predetermined time interval.

11. The magnetic sensor of claim 10, wherein:
    the data transmission signal includes a predetermined pre-transmission time that extends from a time the threshold crossing is detected to a transmission start time of the corresponding data transmission block, wherein the transmission block status information is set to indicate the first status for the predetermined pre-transmission time, and
    on a condition the sensor circuit detects the interrupt event during the predetermined pre-transmission time, the sensor circuit is configured to transmit the corresponding data transmission block in its entirety after the detected interrupt event has passed.

12. The magnetic sensor of claim 11, wherein on the condition the sensor circuit detects the interrupt event during the predetermined pre-transmission time, the sensor circuit is configured to set the transmission block status information to indicate the second status and transmit the corresponding data transmission block in its entirety immediately after the detected interrupt event has passed.

13. The magnetic sensor of claim 10, wherein:
    the sensor circuit is configured to perform an evaluation of the at least one sensor signal and generate the data transmission signal based on the evaluation of the at least one sensor signal, wherein each data transmission block has a protocol configuration comprising a speed signal portion and a data signal portion combined according to a transmission protocol, wherein the speed signal portion corresponds to a rotational speed of the object and the data signal portion provides additional information, the protocol configuration comprises a speed signal pulse as the speed signal portion followed by the data signal portion comprising at least one data unit, the sensor circuit is configured to start the transmission of the corresponding data transmission block at a transmission start time, and the predetermined time interval extends partially into a transmission interval of the corresponding data transmission block that begins at the transmission start time.

14. The magnetic sensor of claim 13, wherein:

on a condition the sensor circuit detects the interrupt event during the predetermined time interval, the sensor circuit is configured to transmit the corresponding data transmission block in its entirety after the detected interrupt event has passed.

15. The magnetic sensor of claim 14, wherein:

the speed signal pulse of the protocol configuration comprises a first transition edge triggered at the transmission start time and a second transition edge trigged at a transition time defined by a pulse length of the speed signal pulse, wherein the predetermined time interval extends partially between the transmission start time and the transition time of the speed signal pulse.

16. The magnetic sensor of claim 14, wherein:

the speed signal pulse of the protocol configuration comprises a first transition edge triggered at the transmission start time and a second transition edge trigged at a transition time defined by a pulse length of the speed signal pulse, wherein the predetermined time interval extends to the transition time of the speed signal pulse.

17. The magnetic sensor of claim 13, wherein the data transmission signal is an AK signal.

18. The magnetic sensor of claim 10, wherein:

the sensor circuit is configured to perform an evaluation of the at least one sensor signal and generate the data transmission signal based on the evaluation of the at least one sensor signal, wherein each data transmission block has a protocol configuration comprising a speed signal portion and a data signal portion combined according to a transmission protocol, wherein the speed signal portion corresponds to a rotational speed of the object and the data signal portion provides additional information, the data transmission signal is a pulse width modulation (PWM) signal, wherein the speed signal portion and the data signal portion are encoded into a pulse width of a signal pulse of a respective data transmission block, and the predetermined time interval extends partially into a transmission interval of the corresponding data transmission block that begins at a transmission start time of the signal pulse.

19. The magnetic sensor of claim 18, wherein:

on a condition the sensor circuit detects the interrupt event during a transmission of the signal pulse and during the predetermined time interval, the sensor circuit is configured to transmit a remaining portion of the signal pulse after the detected interrupt event has passed.

20. A method of transmitting a data transmission signal of a magnetic sensor configured to detect a rotation of an object, the method comprising:

generating, by at least one sensor element, at least one sensor signal based on a magnetic field that is modulated by the rotation of the object;

generating, by a sensor circuit, a data transmission signal based on the at least one sensor signal, wherein the data transmission signal comprises a plurality of data transmission blocks;

storing, by the sensor circuit, transmission block status information in a transmission block status register, wherein the transmission block status information indicates whether or not one of the plurality of data transmission blocks has been triggered for transmission;

determining, by the sensor circuit, that a data transmission block, of the plurality of data transmission blocks, is about to be transmitted;

detecting, by the sensor circuit, an interrupt event that disrupts a transmission of the data transmission signal; and causing, by the sensor circuit and based on a conclusion of the interrupt event, at least a portion of the data transmission block to be transmitted to avoid a complete loss of the data transmission block due to the detected interrupt event based on the transmission block status information present at a time the interrupt event is detected.

* * * * *

UNITED STATES PATENT AND TRADEMARK OFFICE
CERTIFICATE OF CORRECTION

| | |
|---|---|
| PATENT NO. | : 12,135,334 B2 |
| APPLICATION NO. | : 17/854293 |
| DATED | : November 5, 2024 |
| INVENTOR(S) | : Christoph Schroers et al. |

It is certified that error appears in the above-identified patent and that said Letters Patent is hereby corrected as shown below:

In the Claims

In Claim 7, Column 15, Line 63, "perform an evaluation of evaluate the" should be changed to -- perform an evaluation of the --.

Signed and Sealed this
Third Day of December, 2024

Katherine Kelly Vidal
*Director of the United States Patent and Trademark Office*